United States Patent
Gul

(10) Patent No.: US 6,599,012 B2
(45) Date of Patent: Jul. 29, 2003

(54) THERMOWELL ADAPTER

(75) Inventor: S. Asim Gul, Orono, MN (US)

(73) Assignee: Mamac Systems, Inc., Eden Prairie, MN (US)

( * ) Notice: Subject to any disclaimer, the term of this patent is extended or adjusted under 35 U.S.C. 154(b) by 0 days.

(21) Appl. No.: 10/078,734

(22) Filed: Feb. 19, 2002

(65) Prior Publication Data

US 2002/0085617 A1 Jul. 4, 2002

Related U.S. Application Data

(60) Provisional application No. 60/345,491, filed on Jan. 3, 2002.

(51) Int. Cl.[7] .............................. G01K 1/08; G01K 7/02
(52) U.S. Cl. ........................ 374/208; 374/179; 374/148
(58) Field of Search ................................. 374/148, 208, 374/179, 194

(56) References Cited

U.S. PATENT DOCUMENTS

| | | | | |
|---|---|---|---|---|
| 4,137,768 A | * | 2/1979 | Tushie et al. ............... 374/208 |
| 4,334,334 A | * | 6/1982 | Wendell .................. 15/236.01 |
| 4,355,912 A | * | 10/1982 | Haak ........................... 374/208 |
| 4,491,680 A | * | 1/1985 | Manecke .................... 136/230 |
| 4,987,749 A | * | 1/1991 | Baier ........................... 62/222 |
| 5,632,557 A | * | 5/1997 | Simons ....................... 374/148 |
| 6,390,670 B1 | * | 5/2002 | Nimberger et al. ........ 374/142 |
| 6,457,857 B1 | * | 10/2002 | Gul ............................ 374/208 |
| 6,485,175 B1 | * | 11/2002 | Nimberger et al. ........ 374/142 |
| 6,488,408 B1 | * | 12/2002 | Laflamme et al. ......... 374/150 |
| 2002/0127007 A1 | * | 9/2002 | Henrie et al. ............... 392/498 |

* cited by examiner

Primary Examiner—Diego Gutierrez
Assistant Examiner—Lydia M. DeJesús
(74) Attorney, Agent, or Firm—Kinney & Lange, P.A.

(57) ABSTRACT

A thermowell adapter secures a sheathed and flanged sensor within an internally threaded thermowell. The thermowell adapter has a head and a body extending from the head. The body of the thermowell adapter has external threading for mating with the internally threaded thermowell. A passageway within the head and body defines an axis coaxially with the external threading. The sheathed and flanged probe extends within the passageway such that a sensing element of the sheathed and flanged probe extends into the thermowell. An axial securement on the head prevents the sheathed and flanged probe from moving axially in the passageway. A rotational securement that is separate from the axial securement interacts in a mating relationship with squeeze locations on the sheathed and flanged probe to prevent the probe from rotating about its axis in the passageway.

19 Claims, 3 Drawing Sheets

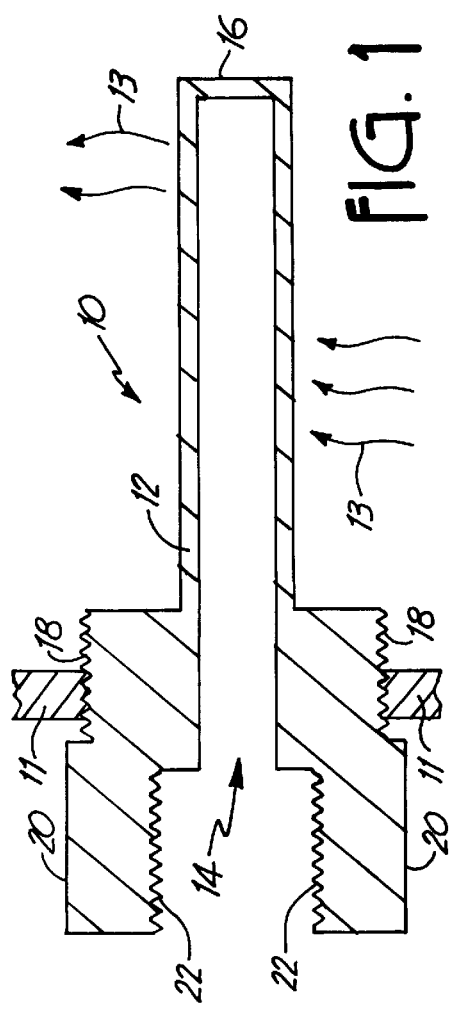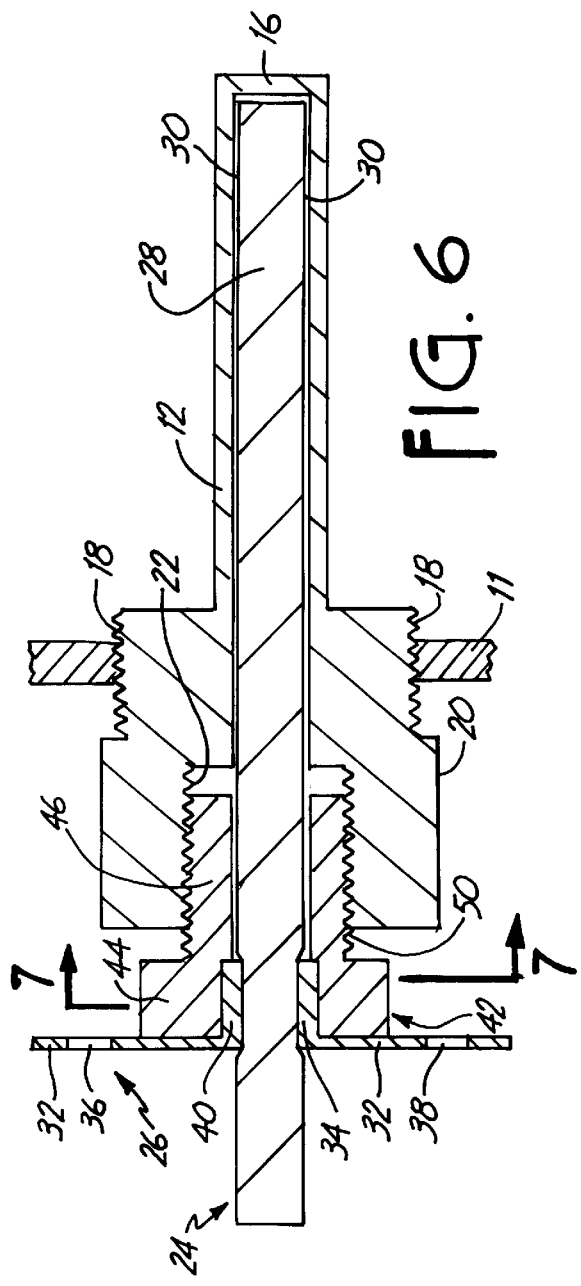

THERMOWELL ADAPTER

CROSS-REFERENCE TO RELATED APPLICATION(S)

The present application claims priority from Provisional Application Serial No. 60/345,491, filed Jan. 3, 2002, entitled THERMOWELL ADAPTER.

BACKGROUND OF THE INVENTION

The present invention relates to temperature sensors, and more particularly, to temperature sensor probes which are releasably attached relative to a wall structure with a thermowell. The present invention relates both to the structure of a thermowell adapter and to the method of attaching the temperature sensors probes relative to a wall structure by using the thermowell adapter.

Numerous temperature sensor structures are known in the prior art, many of which have a temperature sensitive element disposed on the end of a probe. Often it is desired to extend the temperature sensitive element into a fluid flow, such as into the center of an air flow duct, into the center of a liquid flow pipe, into a wind or out from a moving vehicle. The support structure for the temperature sensitive element should disrupt the flow as little as possible, but must be strong enough to withstand the drag of the flow. A metallic sheath is a common component of temperature probes used to support the temperature sensitive element. Sheathed temperature probes commonly include a long, thin cylindrical metallic sheath which houses the temperature sensitive element and extends into the flow. Common sheathed temperature probes include lengths ranging from about 2½ to 12 inches and outer diameters ranging from about ⅛ to ⅜ of an inch.

Often it is desired to attach the temperature probe to a wall or other support structure. With piping and duct systems, it is commonly desired for the temperature probe to attach to the pipe wall or duct wall from outside the pipe or duct. The easiest way to form such an attachment is by opening a hole in the pipe wall or duct wall and inserting one end of the temperature probe through the hole into the pipe or duct. However, any removal or replacement of the temperature probe in such systems opens a leak in the flow piping or duct work. Particularly in fluid systems wherein emptying and filling the system with fluid takes a substantial amount of time, or in systems carrying hazardous fluids, such leaks must be avoided.

Thermowells are structures that are permanently attached into the wall of a pipe or duct. Thermowells extend a recess toward the center of the piping or duct work and into the center of the flow. Thermowells are typically metallic, and the temperature inside the recess is intended to be as close as possible to the temperature of the flow. The temperature probe is inserted into the thermowell, and senses temperature of the flow via conduction through the thermowell. When a thermowell is used, the temperature probe can be removed from the thermowell, and tested, calibrated or replaced, without removal of the thermowell or interruption of the fluid flow.

Commonly, thermowells include internal threading so the temperature probe received therein can screw into the thermowell for attachment. In practice, however, the threaded attachment can be a source of failure for the temperature probe as workers in the field improperly torque the temperature probe into the thermowells. In particular, temperature probes typically include a plurality of wires or leads which extend from the proximal side of the probe. While workers during initial installation will commonly screw the temperature probe into place prior to connecting the leads, the same does not hold true during testing or calibration. If a field worker needs to test the temperature probe in the system but with the temperature probe removed from the thermowell, the field worker may not go to the trouble of disconnecting the leads prior to unscrewing the temperature probe from the thermowell. In addition, the field worker may unadvisedly unscrew the temperature probe without the proper tools, such as by hand rotation of any flange on the temperature probe. This unadvised removal process may stress and break the leads or otherwise damage the temperature probe.

BRIEF SUMMARY OF THE INVENTION

The present invention is a thermowell adapter, which permits installation and removal of a temperature probe into a threaded thermowell without screwing of the temperature probe. The thermowell adapter has a head and a body extending from the head, which jointly define a passageway. The body of the thermowell adapter has external threading for receipt in the internally threaded thermowell. A temperature probe is received into the passageway such that a sensing element of the temperature probe extends into the thermowell. An axial securement on the head releasably prevents the temperature probe from moving axially in the passageway. Separate from the axial securement, a rotational securement prevents the temperature probe from rotating about its axis in the passageway.

BRIEF DESCRIPTION OF THE DRAWINGS

FIG. 1 is a cross-sectional view of a thermowell.

FIG. 6 is a cross-sectional view showing the temperature probe of FIG. 2 (not separately showing internal structure of temperature probe for simplicity) and the thermowell adapter of FIG. 3 and used with the thermowell of FIG. 1.

Figure 2:
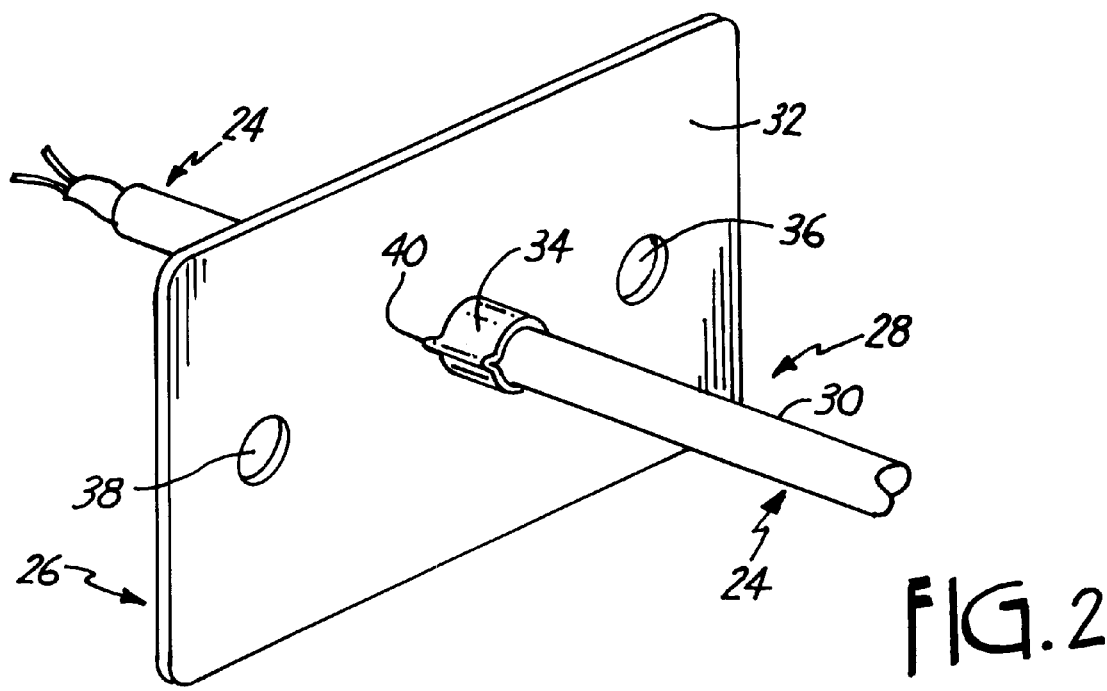
FIG. 2 is a perspective view of a temperature probe for use with the present invention.

While the above-identified figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

FIG. 1 shows a thermowell 10 commonly used with a piping or duct system. The thermowell 10 is received through a sidewall of the piping or duct system 11. A probe lumen 12 defining a probe channel 14 extends into the fluid flow shown by arrows 13. The probe lumen 12 has an end 16 which seals the probe channel 14 from the fluid flow. The thermowell 10 maybe attached to the sidewall 11 of the piping or duct system by any convenient, sealing method. Once installed during construction of the piping or duct system, the thermowell 10 is usually permanent. Thus, the thermowell 10 may be attached to the sidewall such as by welding. In the embodiment shown, the thermowell 10 includes exterior threads 18 which mate with a threaded hole in the sidewall 11. A hexagonal head 20 on the thermowell 10 allows the thermowell 10 to be screwed into the sidewall 11 with a wrench (not shown).

The thermowell 10 includes internal threading 22 for receipt of a temperature probe. The purpose of the thermowell 10 is to allow the temperature probe to be removed, such as during testing, calibration or replacement of the temperature probe, without opening the fluid flow.

The present invention involves a temperature probe and attachment of the temperature probe into the thermowell 10. While many different structures of temperature probes can be used, the present invention particularly contemplates use with a temperature probe such as that taught in pending U.S. patent application Ser. No. 09/635,034, filed Aug. 4, 2000 and entitled SHEATHED AND FLANGED TEMPERATURE PROBE, incorporated herein by reference. As shown in FIG. 2, the temperature probe 24 includes a flange member 26 placed around a sheathed probe 28. The sheath 30 is formed into a metallic cylinder as known in the art.

The flange member 26 includes a flange 32 and a continuous or fully circular sleeve 34. The flange 32 is generally planar, and extends generally normal to the axis of the sleeve 34. The sleeve 34 extends axially for a short distance along the cylindrical sheath 30. The flange 32 and the sleeve 34 are preferably jointly provided by a single flange member 26 integrally formed from a single, unitary piece of metal. Fastener holes 36, 38 are positioned on the flange 32 a significant distance away from the sleeve 34.

The preferred method for axially securing the flange member 26 to the sheathed probe 28 is by a press crimp. The press crimping causes deformation of both the sleeve 34 and the underlying sheath 30. In the preferred embodiment, the initial outer diameter of the sleeve 34 is about 0.295 inches, and the initial inner diameter of the sleeve 34 is about 0.255 inches, and the initial outer diameter of the sheath 30 is about 0.250 inches, the press crimping of the sleeve 34 reduces its outer diameter to about 0.275 inches. The 20 mil wall thickness of the sleeve 34, when crimped to an outer diameter of 0.275 inches, causes the sheath 30 to deform inward to a diameter of roughly 0.235 inches. When the press crimp deforms the sleeve 34, crimp squeezes 40 are squeezed outward such as at opposing 180° locations.

Figure 7:
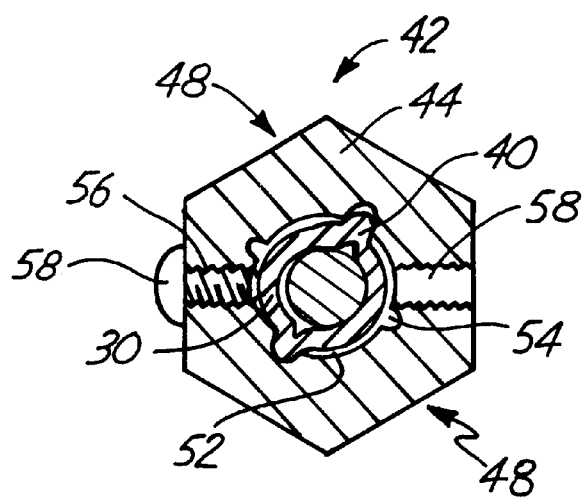
FIG. 7 is a cross-sectional plan view taken along lines 7—7 in FIG. 6.
Figure 3:
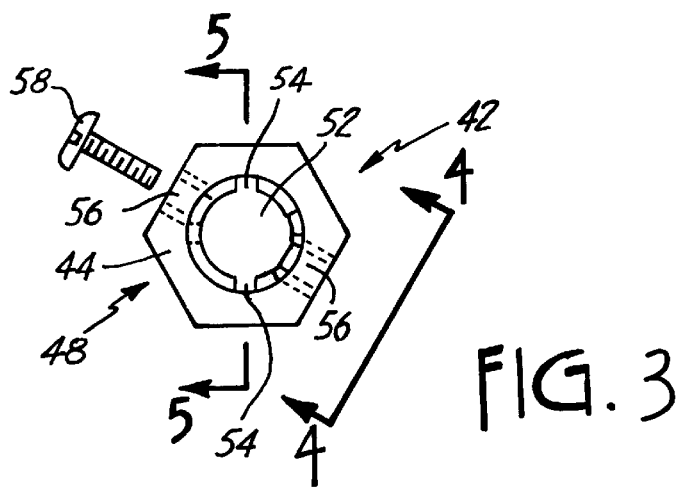
FIG. 3 is a plan view of a thermowell adapter of the present invention.
Figure 4:
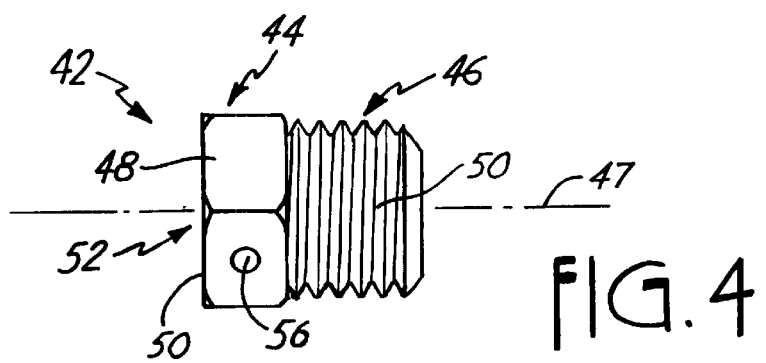
FIG. 4 is a side view of the thermowell adapter of FIG. 3.

The thermowell adapter 42 of the present invention is depicted in FIGS. 3–7. The thermowell adapter 42 includes a head 44 and a body 46 which jointly define an axis 47. The head 44 is preferably shaped for rotation by a tool. For instance, the preferred head 44 is hexagonal with flats 48 for rotation about its axis with a wrench. The head 44 need extend axially only the distance required for mating with its tool. For instance, the preferred head 44 extends axially for only about ¼th of an inch. In any event, the head 44 should extend axially no more than one inch to a head end 50, so the head end 50 does not extend too far from the sidewall 11. In general, the closer the head end 50 is to the sidewall 11 (as shown in FIG. 7), the less susceptible the temperature probe 24 is to receive inadvertant damaging contact. The body 46 has external threading 52 for receipt in the interior threads 22 of the thermowell 10. The body 46 extends axially, and the external threading 52 has an axial length that is in accordance with the threading on standard thermowells (such as about 0.4 inches).

In one preferred embodiment, the head 44 has a width between opposing flats of approximately ⅞ inches for mating with a ⅞th inch wrench. Another preferred embodiment has a width between flats of approximately 9/16th inch for mating with a 9/16th inch wrench. The head 44 has an axial thickness of approximately ¼ of an inch, a thickness sufficient to mate with a tool. Finally, the body 46 extends axially approximately 0.55 inches in one embodiment and 0.40 inches in another embodiment, such that the total length of the thermowell adapter 42 is approximately 0.800 inches in one embodiment and 0.650 inches in another..

A passageway 54 is defined within the head 44 and body 46 of the thermowell adapter 42. The passageway 54 defines an axis coaxially with the external threading 52. The passageway 54 is sized for receiving the temperature probe 24 therethrough such that the sensing element of the temperature probe 24 extends into the thermowell 10. For example, with a temperature probe 24 having a sheath 30 with a 0.25 inch outer diameter, the diameter of the preferred passageway 54 is 0.26 inches.

At least one recess 56 is defined in at least part of the passageway 54, and preferably within the part of the passageway 54 extending through the head 44. The recess 56 prevents the passageway 54 from being cylindrical. The recess 56 is shaped to receive the extensions 40 off the temperature probe 24 in a mating relationship. In the preferred embodiment, four recesses 56 are provided at 90° circumferential locations. Each recess 56 is sized to receive one of the 180° crimp squeezes 40. For example, the recesses 56 maybe provided with a 0.04 inch radius, widening the 0.26 inch diameter to about 0.34 inch to receive the crimp squeezes 40. Thus the recesses 56 allow the temperature probe 24 to be rotationally secured at any of four, 90° positions. Once the temperature probe 24 is axially advanced to the point that the crimp squeezes 40 extend into the recesses 56, interference between the crimp squeezes 40 and the passageway 54 (0.26 inch radius other than the recesses 56) forms a rotational securement which prevents the temperature probe 24 from rotating about its axis in the passageway 54.

Figure 5:
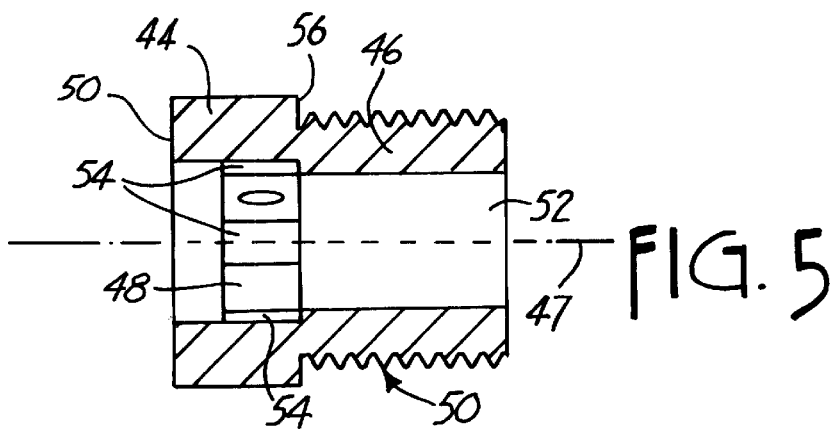
FIG. 5 is a cross-sectional view of the thermowell adapter of FIG. 3.

In the embodiment shown in FIG. 5, the passageway 54 at the opening of the head 42 has a diameter of approximately 0.355 inches. Moving axially within the passageway 54, at approximately 0.100 inches from the head end 50 within the head 44, the diameter of the passageway 54 narrows to approximately 0.260 inches, except at the locations of the recesses 56. Thus, the probe 24 extends into the passageway 54 and the crimp squeezes 40 can extend into the head 44 and be aligned into the recesses 56 in order to secure the fit of the probe 24.

Once the temperature probe 24 is completely inserted into the thermowell adapter 42, the crimp squeezes 40 are within the recesses 56 and the flange 32 abuts the head 44. The temperature probe 24 is then axially secured in place. The preferred axial securement is provided by a set screw 58. The set screw 58 is positioned on the head 44, with a threaded hole which is transverse to the axis 47 and intersects the passageway 54. Positioning the set screw 58 on the head 44 allows the set screw 58 to be accessed even after the thermowell adapter 42 is fully screwed into the thermowell 10.

The set screw 58 is preferably circumferentially positioned such that the set screw 58 does not coincide with any of the recesses 56. In this way, when the set screw 58 is tightened, it impacts the sleeve 34 of the flange member 26 but not either of the crimp squeeze locations 40. The sleeve 34 provides a reinforced section which is thicker than the sheath 30 to receive the force of the set screw 58 without significant denting or damage to the internal wiring. To make sure that the set screw 58 is received in the reinforced section of the temperature probe 24, the set screw 58 should be positioned within about ½ inch from the head end 50. In the preferred embodiment of the temperature probe 24, the sleeve 34 only extends for about ⅛th of an inch, and the set screw 58 should be positioned within ⅛th of an inch from the head end 50. The preferred set screw positioning is ⅛th of an inch from the head end 50. The tightened set screw 58 releasably prevents the temperature probe 24 from moving axially in the passageway 54.

In the preferred embodiment, friction from the set screw 58 by itself also functions to an extent to prevent the temperature probe 24 from rotating. However, the flange 32 allows workers to (unadvisedly) exert a substantial rotational torque on the temperature probe 24, sufficient to overcome the frictional interaction between the set screw 58 and the temperature probe 24. The rotational securement provided by the extension or crimp squeezes 40 received in the recess 56 is completely separate from the set screw 58, and is much stronger than the frictional securement provided by the set screw 58.

In the preferred embodiment, two set screw holes 60 are positioned at opposing locations on the head 44. By having two set screw holes 60, the installation worker can use either of the two holes 60 which is more accessible to tighten down the set screw 58. That is, a user can select from the different sides which set screw 58 is to be used for axial securement. A single set screw 58 may be provided, or a set screw 58 may be loosely positioned in each of the set screw holes 60.

The preferred location of the set screw hole(s) 60 is in the middle of the flats 48. This location for the set screw hole(s) 60 is more easily machined and provides a flat location for receiving the head(s) of the set screw(s) 60. By having the set screws 58 located on the side of the head 44 rather than at the head end 50, the set screws 58 are accessible even with the flange 32 of the temperature probe 24 in place covering up the head end 50.

The thermowell adapter 42 can be machined from any number of materials, according to the environment in which the thermowell 10 is being used. To maintain a proper fit between the threads of the thermowell 10 and thermowell adapter 42, it may be desirable to machine the thermowell adapter 42 from the same material as the thermowell 10, so that thermal expansion properties are substantially the same. In the preferred embodiment, the thermowell adapter 42 is machined from brass. The hardness of brass may be controlled to a limited degree by adjusting the composition of the brass. Generally, brass is considered a "soft" metal, which assists the thermowell adapter 42 in maintaining a tight fit with the threads of the thermowell 10. Additionally, brass does not spark when struck by other metallic tools, reducing the likelihood of damaging the sensor during installation.

While the present invention has been described with respect to a temperature probe 24 and a threaded thermowell 10, other sensors or probes may be used with the present invention. Specifically, sheathed and flanged sensors of many different kinds maybe accommodated in the same manner. Additionally, the thermowell adapter 42 may be manufactured in various sizes and shapes to accommodate different types of sensors and to fit different types of structures.

Although the present invention has been described with reference to preferred embodiments, workers skilled in the art will recognize that changes may be made in form and detail without departing from the spirit and scope of the invention.

What is claimed is:

1. A thermowell adapter comprising:

a head;

a body off the head which has external threading for receipt in an internally threaded thermowell;

a passageway defined within the head and body, the passageway defining an axis coaxially with the external threading, the passageway for receiving a temperature probe therethrough such that a sensing element of the temperature probe extends into the thermowell;

an axial securement on the head which releasably prevents the temperature probe from moving axially in the passageway; and separate from axial securement, a rotational securement which prevents the temperature probe from rotating about its axis in the passageway, wherein the rotational securement is at least one recess defined in the head and open to the passageway, said at least one recess being non-cylindrical for receiving an extension on the temperature probe such that the extension received in the recess prevents the temperature probe from rotating.

2. The thermowell adapter of claim 1, wherein the head is a head with flats for rotation about the axis with a wrench.

3. The thermowell adapter of claim 1, wherein the head has a threaded opening intersecting the passageway, and wherein the axial securement is a set screw in the threaded opening.

4. The thermowell adapter of claim 3, wherein the head is a head with flats for rotation about the axis with a wrench, and wherein the threaded opening is disposed on one of the flats.

5. The thermowell adapter of claim 1, wherein the head has a plurality of threaded openings intersecting the passageway from different sides, and wherein the axial securement is a set screw which can be received in any of the plurality of threaded openings, such that a user can select from which of the different sides the set screw is to be used for axial securement.

6. The thermowell adapter of claim 5, wherein set screws are received in each of the plurality of threaded openings.

7. The thermowell adapter of claim 1, wherein the rotational securement is a plurality of recesses defined in the head and open to the passageway, the recesses being non-cylindrical for receiving at least one extension on the temperature probe such that the extension received in the recess prevents the temperature probe from rotating , wherein the plurality of recesses permit the temperature probe to be rotationally secured in any of a plurality of positions.

8. The thermowell adapter of claim 1, wherein the he ad ex tends axially no more than one inch to a head end, and wherein the axial securement is disposed within ½ inch of the head end.

9. A temperature probe with adapter for use with a thermowell, comprising:

a sheathed and flanged temperature probe comprising:

a temperature probe extending on an axis and having a sensing element received with a cylindrical sheath;

a flanged extending perpendicular to the axis; and a reinforced section on the sheathed and flange temperature probe extending axially along the cylindrical sheath off the flange, the reinforced section having at least one extension so as to provide a non-cylindrical profile; and a thermowell adapter comprising:
  a body which has external threading for receipt in an internally threaded thermowell;
  a passageway defined within the body, the passageway defining an axis coaxially with the external threading, the passageway for receiving the cylindrical sheath of the temperature probe therethrough such that a sensing element of the temperature probe extends into the thermowell; and
  a recess open to the passageway, the recess providing a non-cylindrical profile for receiving the extension on the reinforced section of the temperature probe such that the extension received in the recess prevents the temperature probe from rotating about the axis.

10. The temperature probe with adapter of claim 9, wherein the thermowell adapter further comprises:
  a head extending transverse to the axis off the body; and
  an axial securement on the head which releasably prevents the temperature probe from moving axially in the passageway.

11. The temperature probe with adapter of claim 10, wherein the head has a threaded opening intersecting the passageway, and wherein the axial securement is a set screw in the threaded opening.

12. The temperature probe with adapter of claim 11, wherein the flange and the reinforced section on the sheathed and flanged temperature probe are jointly provided by a single flange member integrally formed from a single, unitary piece of metal, the reinforced section being a continuous sleeve, and wherein the set screw is disposed to intersect the sleeve.

13. The temperature probe with adapter of claim 12, wherein the sleeve is secured onto the cylindrical sheath with a press crimp.

14. The temperature probe with adapter of claim 9, wherein the reinforced section is secured onto the sheath with a press crimp, such that the reinforced section is squeezed outward at squeeze locations about the circumference of the reinforced section, and wherein the recess of the thermowell adapter receives the squeeze locations of the reinforced section.

15. A method of attaching a temperature probe into an internally threaded thermowell, comprising:
screwing a thermowell adapter into the thermowell, the thermowell adapter comprising:
  a head;
  a body off the head which has external threading for receipt in the internally threaded thermowell;
  a passageway defined within the head and body, the passageway defining an axis coaxially with the external threading,
  a recess defined within the thermowell adapter; and
  an axial securement on the head; inserting a temperature probe into the passageway, the temperature probe comprising:
  a sensing element;
  a cylindrical sheath about the sensing element and extending along an axis; and
  at least one extension so as to provide a non-cylindrical profile;
  the temperature probe being inserted a sufficient amount such that the sensing element of the temperature probe extends into the thermowell and such that the extension mates with the recess of the thermowell adapter, the mating of the extension with the recess of the thermowell adapter preventing the temperature probe from rotating about the axis; and
releasably securing the axial securement to thereby prevent the temperature probe from moving axially in the passageway.

16. The method of claim 15, wherein the extension on the temperature probe is a squeeze location squeezed outward by a press crimp.

17. The method of claim 15, wherein the head is a head with flats, and wherein the screwing a thermowell adapter into the thermowell comprises rotating the thermowell adapter about the axis with a wrench.

18. The method of claim 15, wherein the head has a threaded opening intersecting the passageway, wherein the axial securement is a set screw in the threaded opening, and wherein the releasably securing act comprises tightening the set screw.

19. The method of claim 18, wherein the extension on the temperature probe is a squeeze location of a sleeve squeezed outward by a press crimp, and wherein tightening the set screw sets the set screw into the sleeve.

* * * * *